Jan. 2, 1940.  A. RAFTER  2,185,384
STRUCTURAL MEMBER
Filed April 20, 1938   2 Sheets-Sheet 1
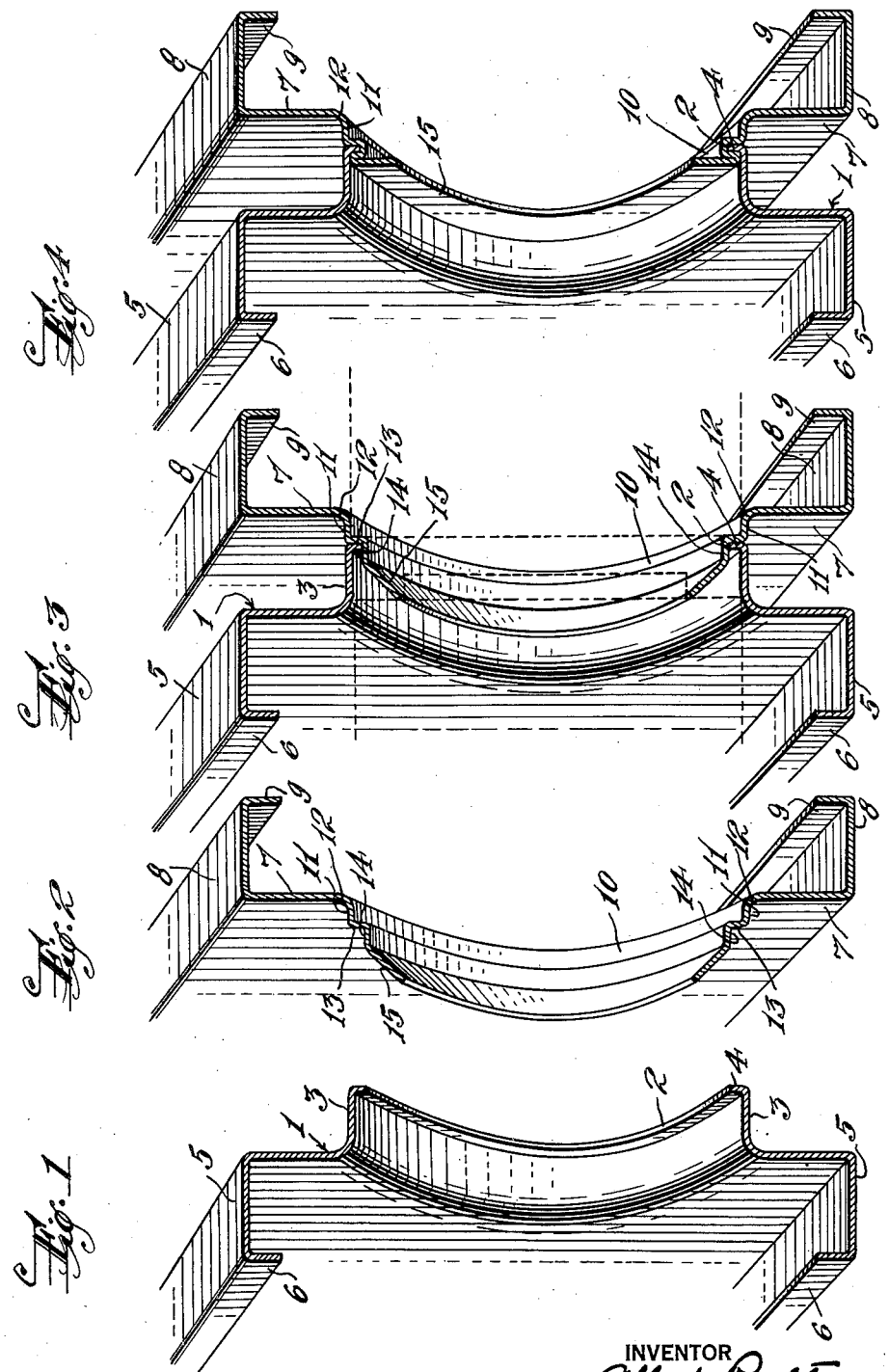
INVENTOR
Albert Rafter,
BY Frank C. Fischer
ATTORNEY

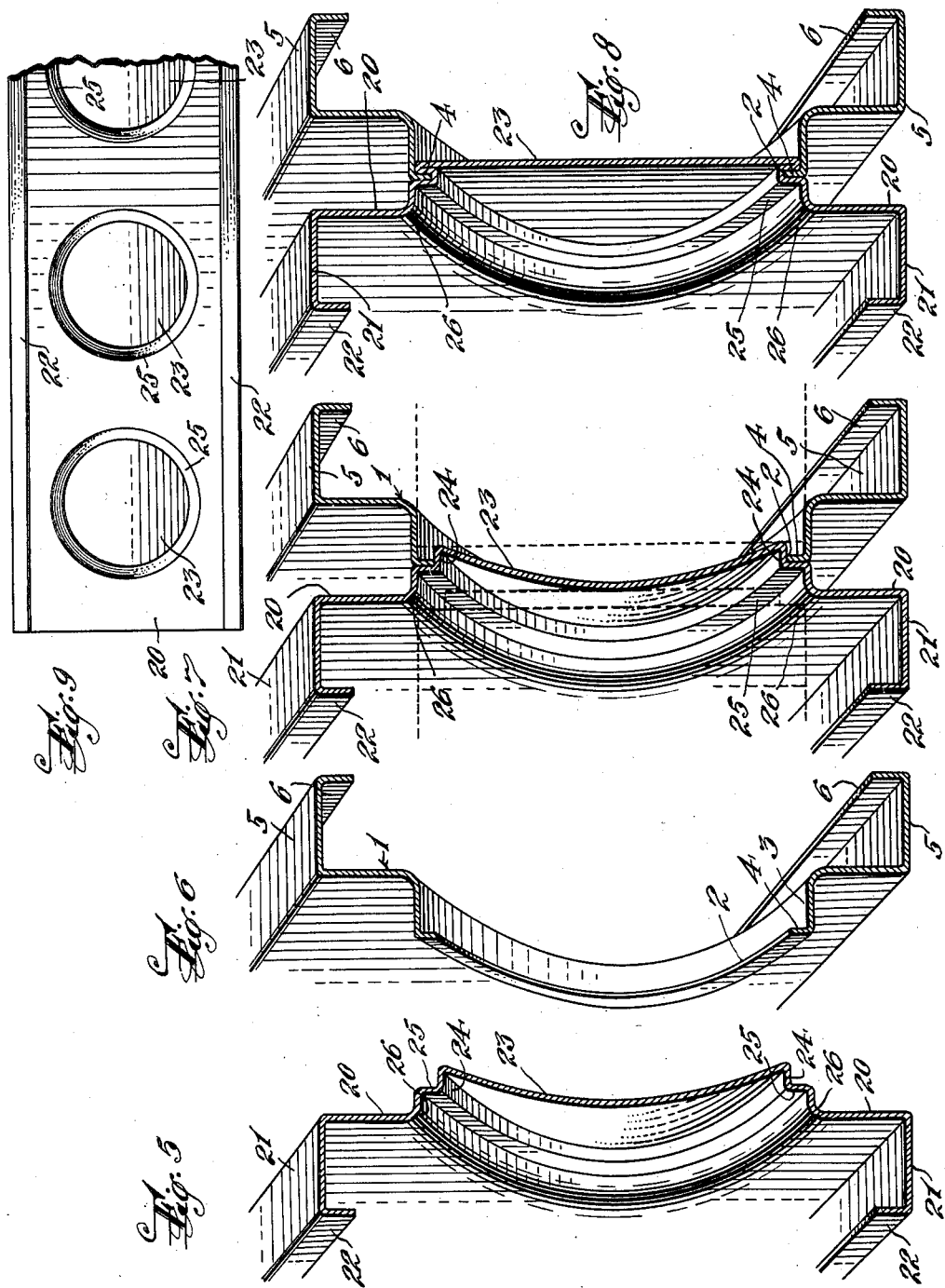

Patented Jan. 2, 1940

2,185,384

UNITED STATES PATENT OFFICE 2,185,384

STRUCTURAL MEMBER

Albert Rafter, Glen Ridge, N. J., assignor to Rafter Machine Company, Belleville, N. J., a partnership composed of Albert Rafter and John C. Rafter, Jr.

Application April 20, 1938, Serial No. 203,022

4 Claims. (Cl. 189—37)

This invention relates to improvements in structural members for use in building construction, and to a method of making the same from sheet metal.

In building construction it is desirable that metal studs, rafters, beams and the like, be as light in weight as possible, and at the same time provide the necessary strength. It has been found advantageous to make such members from sheet metal but structures heretofore provided have been objectionable in that they were made from complicated forms and in many instances required welding or the like for joining elements thereof together.

It is an object of this invention to provide a metallic member for building construction which can be made from two plates of sheet metal securely joined together in a novel manner to provide a rigid structure of light weight and great strength.

A further object of the invention is to provide in a metal structural member, a joint for securing two plates of sheet metal together in a positive and permanent manner.

These and other advantageous objects, which will later appear, are accomplished by the simple and practical construction and arrangement of parts hereinafter described and exhibited in the accompanying drawings, forming part hereof, and in which:

Fig. 1 is a sectional view of an element used in making a metallic structural member in accordance with the invention, Fig. 2 is a sectional view of another element used in the making of the structural member, Fig. 3 is a sectional view showing a step in the process of joining the two members together, Fig. 4 is a perspective view partly in section, of a metallic structural member made in accordance with the invention, Fig. 5 is a sectional view of an element used for making the modified form of the invention, Fig. 6 is a sectional view of another element used in the modified form, Fig. 7 is a sectional view showing the step in the process of joining the elements shown in Figs. 5 and 6 together, Fig. 8 is a perspective view partly in section of a modified form of structural member, and Fig. 9 is an elevational view of a portion of a beam constructed in accordance with my invention.

Referring to the drawings, in Fig. 1 there is shown an element in making a metal structural member, which comprises a sheet metal plate 1 having an aperture 2 therein along the longitudinal center line thereof. Surrounding the aperture 2, the plate has a right angularly directed flange 3 provided with an inturned portion 4.

The edges of the plate have flanges 5 bent at right angles in the direction opposite to the flanges 3, the flanges 5 being provided with inturned portions 6.

In Fig. 2 is shown a second element used in making the structural member, which second element comprises a plate 7 having the edges thereof bent at right angles to provide flanges 8 having inturned portions 9. The plate 7 is provided with an aperture 10 along the longitudinal center line thereof, which is surrounded by a cylindrical flange 11, directed opposite to flange 8. The flange 11 has an inturned portion 13, the innermost edge of which is bent outwardly at right angles to provide a cylindrical flange 14 having the extreme portion thereof bent downwardly at an angle to provide a conical flange 15.

In making the metallic structural member, the conical flange 15 and flange 14 of the element shown in Fig. 2 are inserted in the aperture 2 of the element shown in Fig. 1, so that portion 4 abuts portion 13 of flange 11. A tool, as indicated in dotted lines in Fig. 3 is inserted through aperture 2 and bears against the edge of the conical flange 15. A second tool bears against the downturned portion 13 of flange 11. When pressure is applied to the tools, conical flange 15 and flange 14 are bent parallel to each other with the flange 14 abutting the opposite side of portion 4 thus securing portion 4 between portion 13 of flange 11 and flange 14 as shown in Fig. 4.

From the above description it will be seen that there has been provided a rigid joint for permanently securing the two elements of the metallic structural member together. The securing operation obviously is simple and can be rapidly accomplished.

In making a metallic structural member for building construction, the plates 1 and 7 are provided with a plurality of apertures such as 2 and 10, and the structure of the plate surrounding each aperture and the manner of joining the plates at each aperture is the same as above described.

In Figs. 5, 6, 7 and 8 are shown the steps in making a modified form of the invention.

In Fig. 5 is shown an element comprising a plate 20 having an outturned flange 21 provided with an inturned portion 22. Along the longitudinal center line thereof the plate 20 is provided with a concave portion 23 which has the edges thereof encircled by a flange 24 having a right angularly directed portion 25 connected to a flange 26 at right angles to plate 20.

In Fig. 6 is shown a second element used in the modified form of the invention which element is of the same structure as shown in Fig. 1. In joining the elements of Figs. 5 and 6 together, the concaved portion 23 and the flange 24 are inserted in aperture 2 so that the portion 25 abuts the inturned portion 4 of flange 3. Now by the use of tools bearing against portion 25 of flange 24 and the concave portion 23, the concave portion 23 is straightened out and flange 24 is caused to abut the inturned portion 4 of flange 3 as shown in Fig. 8, thus tightly joining the two elements together to provide a rigid and permanent joint.

While the apertures are shown in the drawing as being circular and arranged along the longitudinal center line of the structural member, it is obvious that the apertures can be of other shapes and arranged in manners other than along the longitudinal center line without departing from the spirit of this invention.

The foregoing disclosure is to be regarded as descriptive and illustrative only, and not as restrictive or limitative of the invention, of which, obviously, embodiments may be constructed, including many modifications, without departing from the spirit and scope of the invention herein set forth and denoted in the appended claims.

Having thus described my invention, what I claim as new and desire to secure by Letters Patent, is:

1. In a structural member for building construction, a first metal plate and a second metal plate, said plates being spaced apart and provided with a plurality of spaced apertures, flanges surrounding said apertures, the flanges on the first plate having inwardly directed portions and the flanges on the second plate having inturned flanges abutting one side of the inwardly directed portions of said first plate, said inturned flanges having portions bent outwardly and abutting the other sides of said inwardly directed portions of said first plate, said outwardly bent portions being bent back upon themselves.

2. In a structural member for building construction, a first metal plate and a second metal plate spaced apart, said first plate having a plurality of spaced apertures, flanges surrounding said apertures and having inwardly directed portions, flanges on said second plate passing through said apertures in the first plate and having portions bent around and abutting both sides of said inwardly directed portions of said first plate, said flanges on the second plate being further bent to provide inwardly directed portions parallel to the portions abutting the inwardly directed portions of the first plate.

3. In a structural member for building construction, a first metal plate and a second metal plate spaced apart, said first plate having a plurality of spaced apertures, right angularly directed flanges surrounding said apertures and having right angularly inwardly directed portions, right angularly directed flanges on said second plate passing through said apertures in said first plate and having portions bent around and abutting both sides of said inwardly directed portions of said first plate, said flanges on the second plate being further bent to provide inwardly directed portions parallel to the portions abutting the inwardly directed portions of the first plate.

4. In a structural member for building construction, a first metal plate and a second metal plate, said plates being spaced apart and provided with a plurality of spaced apertures, right angularly directed flanges surrounding said apertures, the flanges on the first plate having inwardly directed portions and the flanges on the second plate having inturned flanges abutting one side of the inwardly directed portions of said first plate, said inturned flanges having portions bent outwardly and abutting the other sides of said inwardly directed portions of the first plate, said outwardly bent portions being bent back upon themselves and at right angles to the first mentioned flanges.

ALBERT RAFTER.